(12) United States Patent
Kouyama et al.

(10) Patent No.: US 7,044,006 B2
(45) Date of Patent: May 16, 2006

(54) SEAT WEIGHT MEASURING APPARATUS

(75) Inventors: Seiichi Kouyama, Hikone (JP); Tomotoshi Senoh, Hikone (JP)

(73) Assignee: Takata Corporation, Tokyo (JP)

( * ) Notice: Subject to any disclaimer, the term of this patent is extended or adjusted under 35 U.S.C. 154(b) by 21 days.

(21) Appl. No.: 10/852,227

(22) Filed: May 25, 2004

(65) Prior Publication Data
US 2005/0044969 A1    Mar. 3, 2005

(30) Foreign Application Priority Data
Aug. 26, 2003   (JP) .............................. 2003-300905

(51) Int. Cl.
*G01L 5/00* (2006.01)
(52) U.S. Cl. ........................ 73/862.381; 73/862.582; 73/862.474; 177/136
(58) Field of Classification Search ................ 340/667; 73/768, 862.582, 862.474, 862.381; 177/276, 177/136
See application file for complete search history.

(56) References Cited

U.S. PATENT DOCUMENTS

| | | | | |
|---|---|---|---|---|
| 5,942,695 A | * | 8/1999 | Verma et al. ................. 73/768 |
| 6,069,325 A | * | 5/2000 | Aoki .......................... 177/136 |
| 6,161,891 A | * | 12/2000 | Blakesley ................. 296/65.01 |
| 6,244,116 B1 | * | 6/2001 | Osmer et al. .......... 73/862.474 |
| 6,345,543 B1 | * | 2/2002 | Aoki ..................... 73/862.474 |
| 6,356,200 B1 | * | 3/2002 | Hamada et al. ............. 340/667 |
| 6,571,647 B1 | | 6/2003 | Aoki et al. |
| 6,755,571 B1 | * | 6/2004 | Kajiyama ................... 384/276 |

FOREIGN PATENT DOCUMENTS

EP      0 534 226 A1      3/1993

* cited by examiner

*Primary Examiner*—Max Noori
*Assistant Examiner*—Linda P. Field
(74) *Attorney, Agent, or Firm*—Foley & Lardner LLP

(57) ABSTRACT

A seat weight measuring apparatus includes a base frame and a sensor portion which is mounted on the base frame and configured to detect a load applied to a vehicle seat. The sensor portion includes a sensor plate provided with a plurality of measuring gauges, and the sensor plate is supported by and fixed to a column disposed on the base frame. The seat weight measuring apparatus has a heat transmission route through which heat transmitted to the column is directly transmitted from the column to the sensor plate. Further, the seat weight measuring apparatus includes, between the sensor plate and the column, a heat transmission bypass through which heat transmitted to the column is transmitted to the sensor plate to bypass the heat transmission route.

10 Claims, 4 Drawing Sheets

SEAT WEIGHT MEASURING APPARATUS

BACKGROUND

The present invention pertains to a technical field of a seat weight measuring apparatus for measuring the weight of a seat for a vehicle (such as an automobile) including a load applied to the seat and, particularly, to a technical field of a seat weight measuring apparatus provided with a sensor portion comprising measuring gauges such as strain gauges for measuring force due to the seat weight.

As a seat weight measuring apparatus of this kind, there has been conventionally proposed a seat weight measuring apparatus comprising an arm to which force due to the weight of a seat for a vehicle (such as an automobile) including a load applied to the seat is applied and which transmits the force to a sensor portion (for example, see U.S. Pat. No. 6,571,647 (incorporated by reference herein)).

As shown in FIGS. 4(A) through 4(D), a seat weight measuring apparatus 100 disclosed in U.S. Pat. No. 6,571,647 has a pin bracket 101 to which the seat weight is applied, an arm 102 which transmits force due to the seat weight, a sensor portion 103 which detects the force applied from two branched tips 102A of the arm 102 to measure the seat weight, and a base frame 107.

The pin bracket 101 and the arm 102 are pivotally connected by a stopper bolt 105 extending through holes 106 formed in left and right side walls 101L, 101R of the pin bracket 101 and holes 109 formed in left and right side walls 102L, 102R of the arm 102. The stopper bolt 105 further extends through elongate holes 108 which are long in a vertical direction and are formed in left and right side walls 107L, 107R of the base frame 107.

The arm 102 is pivotally supported to the left and right walls 107L, 107R of the base frame 107 by a pivot bolt 110. The tips 102A of the arm 102 are adapted to transmit the force to upper and lower half arms 119, 120 which are fixed to force transmission portions 104C, 104D on both sides of the sensor plate 104. Therefore, the seat weight is applied to the arm 102 from the pin bracket 101 as shown in FIG. 4(B) and the force corresponding to the seat weight is transmitted to the sensor plate 104 of the sensor portion 103 via the upper and lower half arms 119, 120.

The sensor plate 104 of the sensor portion 103 is supported by a column 111 standing on the middle of the bottom of the base frame 107. The sensor plate 104 is fixed by screwing a nut 112 onto the column 111. The sensor plate 104 is elastically distorted by the force applied from the arm 102 according to the force. As shown in FIG. 5, the distortion of the sensor plate 104 is detected by four strain gauges 113, 114, 115, and 116 attached to the sensor plate 104, whereby the sensor portion 103 measures the seat weight. The four strain gauges 113, 114, 115, 116 cooperate to form a bridge circuit.

In the seat weight measuring apparatus 100, as shown in FIG. 5, the sensor plate 104 is formed to have two necks 104A, 104B. The four strain gauges 113, 114, 115, 116 are arranged in alignment such that pairs are placed symmetrically about the column 111. The reason why the sensor plate 104 is provided with the necks 104A, 104B and the four strain gauges 113, 114, 115, 116 is as follows. As force due to the seat weight is transmitted to the force transmission portions 104C, 104D of the sensor plate 104, one of the strain gauges 113, 114 in pair on one side and one of the strain gauges 115, 116 in pair on the other side are subjected to tension, while the other one of the strain gauges 113, 114 in pair on the one side and the other one of the strain gauges 115, 116 in pair on the other side are subjected to compression. By designing the sensor portion so that one of two strain gauges on the same side is subjected to tension and the other one is subjected to compression, the sensitivity of measurement by the four strain gauges arranged to form a bridge circuit is improved, thereby accurately measuring the force (i.e., the seat weight).

In case the force transmitted to the sensor plate 104 is measured by the four strain gauges 113, 114, 115, 116 which are arranged to form a bridge circuit, heat of ambient temperature of the seat weight measuring apparatus 100 is transmitted from the center of the sensor plate 104 toward the force transmission portions 104C, 104D on both sides via the bottom plate of the base frame 107 and the column 111 as shown by arrows in FIG. 5. Therefore, as the ambient temperature changes, the thermal change is also transmitted from the center of the sensor plate 104 toward the force transmission portions 104C, 104D, thus causing a temperature difference between the resistors of the inner (center-side) strain gauges 114, 115 and the resistors of the outer (force transmission portion-side) strain gauges 113, 116. Accordingly, due to a change in ambient temperature, the accuracy in measurement of force by the respective strain gauges 113, 114, 115, 116 is deteriorated.

As a result, this conventional device includes a temperature sensing resistor 117 disposed on the sensor plate 104 to compensate for the temperature differences between the resistors of the inner strain gauges 114, 115 and the resistors of the outer strain gauges 113, 116 as shown in FIG. 5.

As the ambient temperature of the seat weight measuring apparatus 100 rapidly changes, however, a temperature difference that is more than that can be compensated by the temperature sensing resistor 117 occurs between the resistors of the strain gauges 113, 114, 115, 116. That is, there is a problem that the accuracy in measurement of force by the strain gauges 113, 114, 115, 116 is deteriorated even with the temperature sensing resistor 117 when the ambient temperature is rapidly changed. As a means of solving this problem, heat insulation materials may be attached to the peripheries of the seat weight measuring apparatus. However, the heat insulation materials can not effectively inhibit the thermal change transmitted through the column 111.

SUMMARY

One object of the present invention is to provide a seat weight measuring apparatus in which, even though the ambient temperature rapidly changes, the temperature difference among the resistors of the measuring gauges can be reduced.

According to an embodiment of the present invention, a seat weight measuring apparatus is provided. The apparatus includes a base frame and a sensor portion which is mounted on the base frame to detect load applied to a vehicle seat, wherein said sensor portion has a sensor plate provided with a plurality of measuring gauges, and the sensor plate is supported by and fixed to a column disposed on said base frame, and wherein said seat weight measuring apparatus has a heat transmission route through which heat transmitted to said column is directly transmitted from the column to said sensor plate, and is characterized by being further provided, between said sensor plate and said column, with a heat transmission bypass through which heat transmitted to said column is transmitted to said sensor plate to bypass said heat transmission route.

The heat transmission bypass may include a thermo plate arranged between the sensor plate and the column.

According to an embodiment of the present invention, heat due to the ambient temperature of the seat weight measuring apparatus transmitted to the column is directly transmitted from the column to the sensor plate through the heat transmission route and also is transmitted from the column to the sensor plate through the heat transmission bypass. Because of the heat bypass effect by the heat transmission bypass, the heat is transmitted substantially uniformly to the measuring gauges provided on the sensor plate, thereby reducing the temperature difference among resistors of the measuring gauges. Therefore, even when the ambient temperature rapidly changes as mentioned above, the temperature difference caused among the resistors of the measuring gauges can be effectively reduced. As a result of this, not only when a normal temperature change is caused but also when a rapid change is caused in the ambient temperature, the force (i.e. the seat weight) can be measured by the measuring gauges with great accuracy.

The heat transmission bypass may include the thermo plate and the thermo plate can be formed of a band-like plate made of heat conductive material. Therefore, the simple structure of the heat transmission bypass can be achieved and the compact seat weight measuring apparatus is achieved even when the thermo plate is provided.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 4(A)–4(D) partially show the seat weight measuring apparatus disclosed in U.S. Pat. No. 6,571,647, wherein FIG. 4(A) is a plan view, FIG. 4(B) is a front view, FIG. 4(C) is a sectional view taken along a line C—C of FIG. 4(B), and FIG. 4(D) is a sectional view taken along a line D—D of FIG. 4(B).

DETAILED DESCRIPTION

Figure 1:
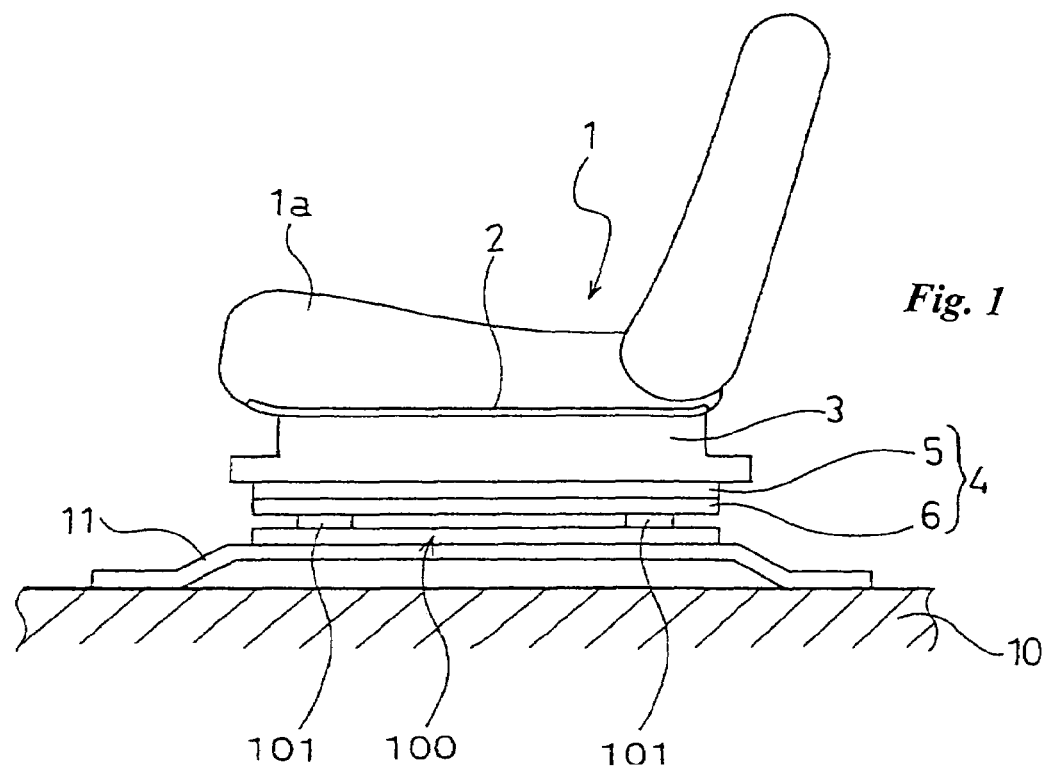
FIG. 1 is an illustration schematically showing a state that a seat weight measuring apparatus according to the present invention is carried out.
Figure 2:
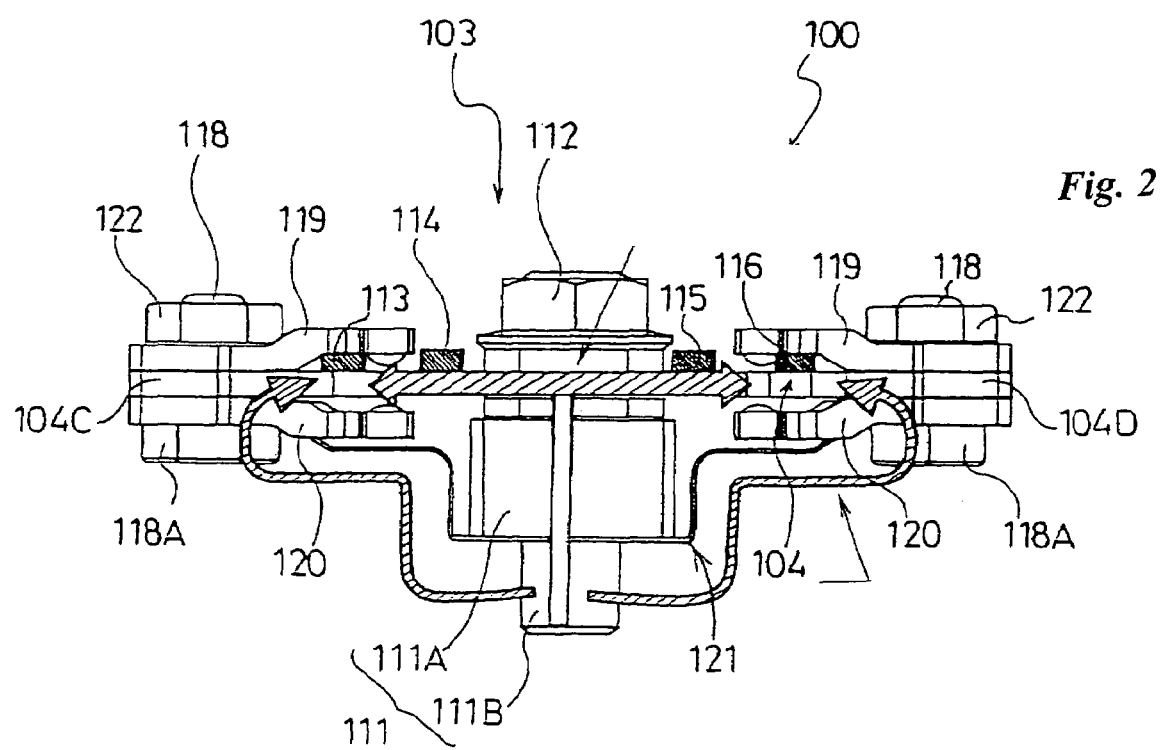
FIG. 2 is a partial view partially and schematically showing a preferred embodiment for carrying out the seat weight measuring apparatus according to the present invention.

FIG. 1 is an illustration schematically showing a vehicle seat to which a seat weight measuring apparatus according to the present invention is adopted, and FIG. 2 is a partial view partially and schematically showing one embodiment for carrying out the seat weight measuring apparatus according to the present invention.

Figure 4A:
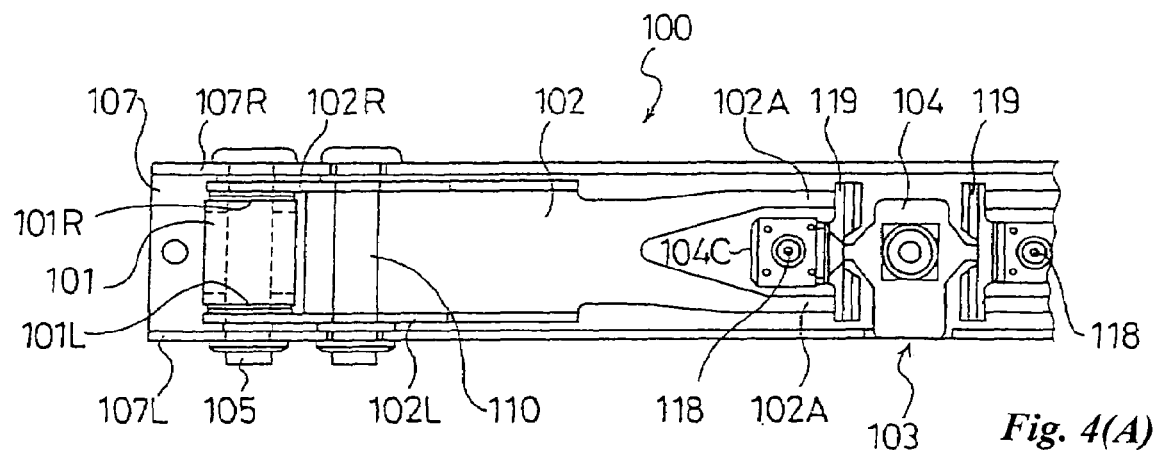
Figure 4B:
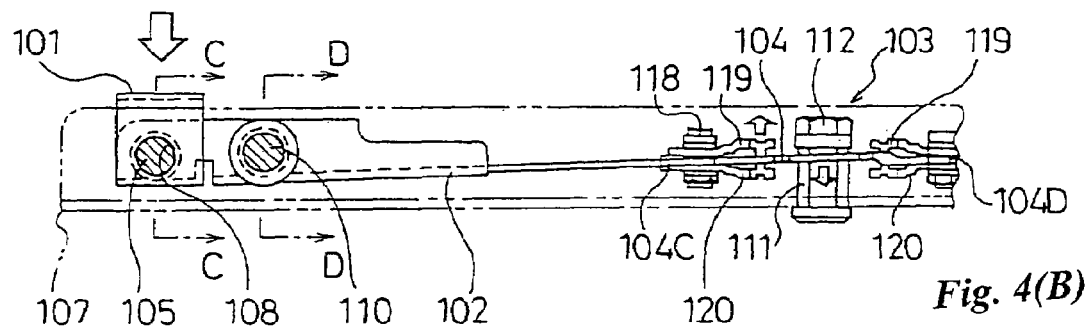
Figure 4C:
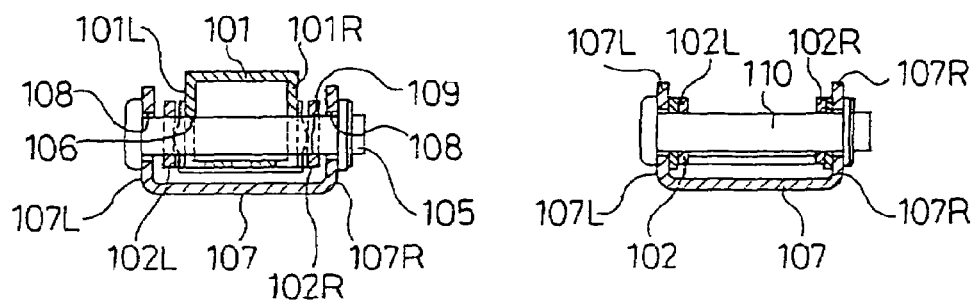
Figure 4D:
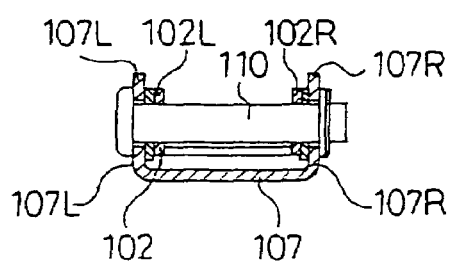
Figure 5:
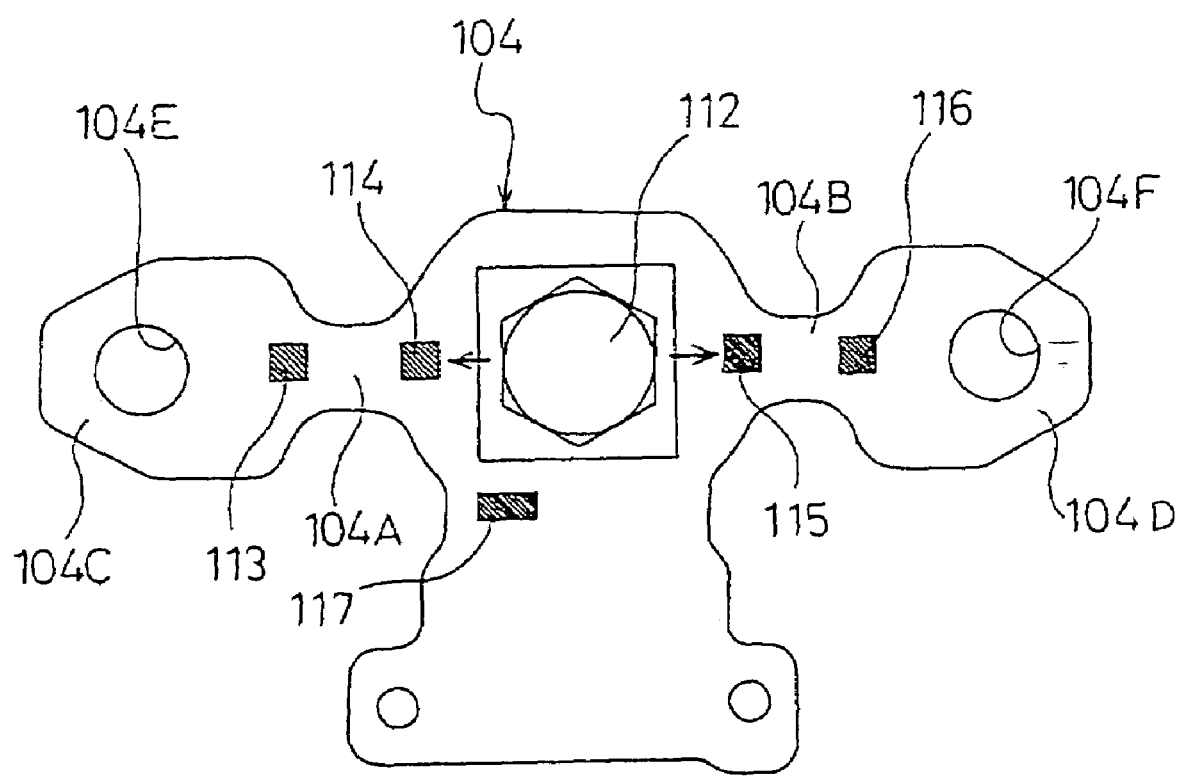
FIG. 5 is a top view of a sensor plate of the conventional seat weight measuring apparatus shown in FIGS. 4(A)–4(D).

Conventional components that disclosed are shown in FIGS. 4(A), 4(B) and FIG. 5 are marked with the same reference numerals and detailed description thereof will be omitted. In the description below, the forward, backward, leftward, rightward, upward, and downward directions correspond to the forward, backward, leftward, rightward, upward, and downward directions of a vehicle.

As shown in FIG. 1, a vehicle seat 1 has a seat cushion 1a on which an occupant can sit, and a seat pan 2 made of a steel sheet which is disposed beneath the seat cushion 1a to entirely cover the bottom surface of the seat cushion 1a. Under the seat pan 2, a pair of side frames 3 (only one of the side frames 3 is shown in FIG. 1) extend downwardly from the seat pan 2 and are spaced apart from each other at a predetermined distance in the lateral (left-to-right) direction of the vehicle. Each side frame 3 is disposed to extend in the longitudinal (front-to-rear) direction of the vehicle.

Disposed on the lower ends of the side frames 3 are seat rails 4 (only one of the seat rails 4 is shown in FIG. 1), respectively. Each seat rail 4 is a combination of an upper rail 5 which is fixed to the lower end of the side frame 3 and a lower rail 6 which is arranged to be slidable relative to the upper rail 5 in the longitudinal direction of the vehicle. Therefore, the seat rails 4 are provided for guiding the vehicle seat 1 slidably in the longitudinal direction of the vehicle.

Each of seat weight measuring apparatuses 100 (only one of the seat weight measuring apparatuses 100 is shown in FIG. 1) is disposed under the corresponding lower rail 6 via a pair of front and rear pin brackets 101, 101 extending in the lateral direction of the vehicle. These seat weight measuring apparatuses 100 are fixed to seat brackets 11 (only one of the seat brackets 11 is shown in FIG. 1) which are secured to a vehicle floor 10 and spaced apart from each other at a predetermined distance in the lateral direction of the vehicle. Since the seat brackets 11 are secured to the vehicle body, the vehicle seat 1 can be stably supported to the vehicle body, thereby achieving further precise detection of the weight (load) of the vehicle seat 1 by the seat weight measuring apparatuses 100.

It should be noted that the seat weight measuring apparatuses 100 may be directly fixed to the vehicle floor 10, without using the seat brackets 11. The seat weight measuring apparatuses 100 may be disposed between the side frames 3 and the upper rails 5 of the seat rails 4.

As shown in FIG. 2, similarly to the seat weight measuring apparatus 100 disclosed in the aforementioned U.S. Pat. No. 6,571,647, the seat weight measuring apparatus 100 comprises a sensor plate 104 having force transmission portions 104C, 104D to which upper and lower half arms 119, 120 are fixed by bolts 118. The arm 102 (not shown in FIG. 2) transmits force due to the seat weight from tips 102A (not shown in FIG. 2) of the arm 102 to the sensor plate 104 of the sensor portion 103 via the upper and lower half arms 119, 120.

Similarly to the seat weight measuring apparatus 100 disclosed in the aforementioned U.S. Pat. No. 6,571,647, the sensor plate 104 is supported and fixed to a column 111 standing on the middle of the bottom of the base frame 107 (not shown in FIG. 2) by a nut 112. Attached to the sensor plate 104 are four strain gauges 113, 114, 115, and 116 which cooperate to form a bridge circuit.

Figure 3A:
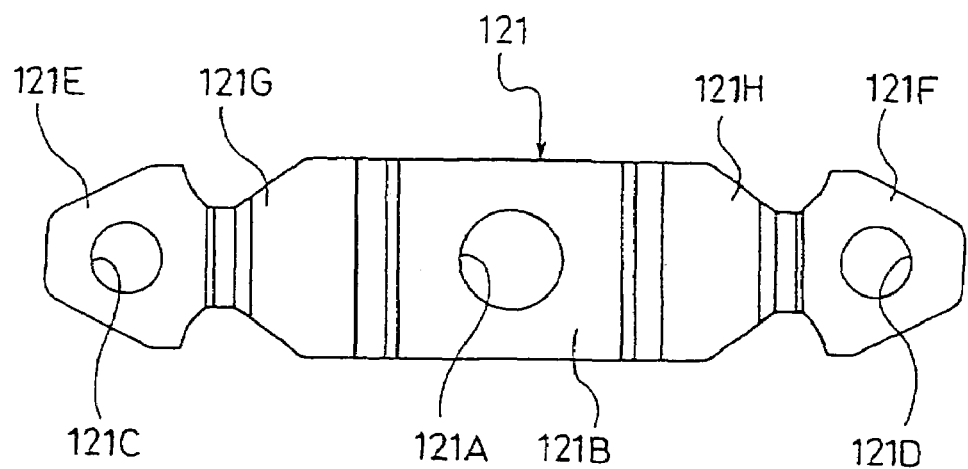
FIGS. 3(A)–3(C) schematically show a thermo plate employed in the seat weight measuring apparatus of the embodiment shown in FIG. 2.
Figure 3B:
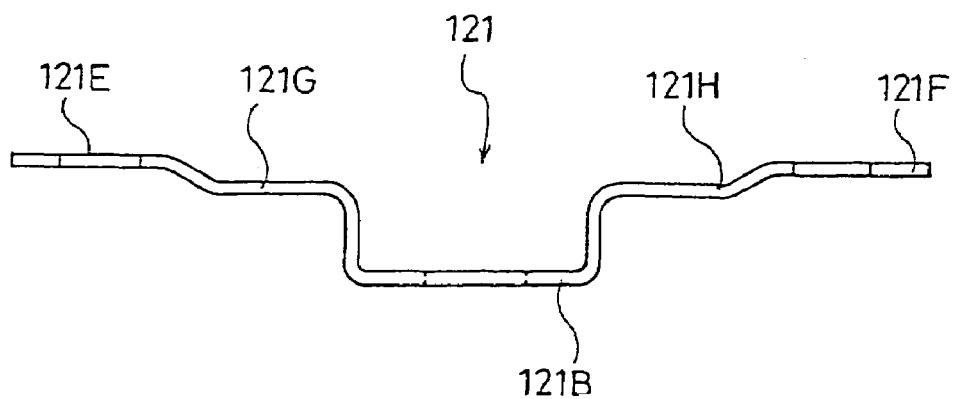
Figure 3C:
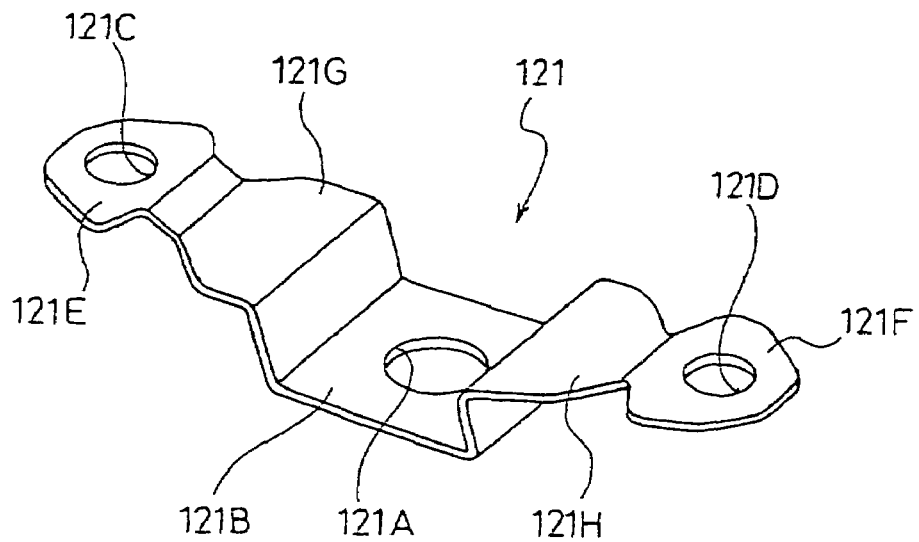

The seat weight measuring apparatus 100 of this embodiment is further provided with a thermo plate 121 between the column 111 and the lower half arms 120. As shown in FIGS. 3(A) through 3(C), a band-like plate made of heat-conductive material is bent into a predetermined configuration by, e.g., a pressing process and is then subjected to a surface treatment and, after that, subjected to a baking treatment, thereby forming the thermo plate 121. The thermo plate 121 comprises a flat column contact portion 121B which is disposed to be in contact with a large-diameter portion 111A of the column 111 and has a hole 121A allowing the penetration of a small-diameter portion 111B of the column 111, mounting portions 121E, 121F having holes 121C, 121D through which bolts 118 for mounting the upper and lower half arms 119, 120 to the sensor plate 104 are inserted, respectively, and the heat transmitting portions 121G, 121H formed between the column contact portion 121B and the mounting portions 121E, 121F.

As shown in FIG. 2, the hole 121A is fitted onto the small-diameter portion 111B of the column 111 to bring the column contact portion 121B into contact with the bottom of the large-diameter portion 111A of the column 111. Then, the bolts 118 are inserted from below through the holes 121C, 121D of the thermo plate 121, the holes (not shown) of the lower half arms 119, the holes 104E, 104F of the sensor plate 104 (as in FIG. 5), and the holes (not shown) of the upper half arms 120. Then, nuts 122 are screwed onto the bolts 118 so that the mounting portions 121E, 121F are held between the bottoms of the lower half arms 119 and the heads 118A of the bolts 118, thereby assembling the thermo plate 121 between the sensor plate 104 and the column 111.

The other structures of the seat weight measuring apparatus 100 are the same as those of the seat weight measuring apparatus 100 previously disclosed, as partially shown in FIG. 4 and FIG. 5. The method of measuring the seat weight by the seat weight measuring apparatus 100 of this embodiment is also the same as that by the seat weight measuring apparatus previously disclosed.

Referring to FIG. 2, in the seat measuring apparatus 100 of this embodiment having the structure as mentioned above, the thermo plate 121 is provided between the sensor plate 104 and the column 111, whereby the heat due to the ambient temperature of the seat weight measuring apparatus 100 is transmitted to the sensor plate 104 through two transmission routes: a) a heat transmission route (1), similar to the conventional one, through which the heat is transmitted from the column 111 to the center of the sensor plate 104 and is further transmitted from the center of the sensor plate 104 to the respective strain gauges 113, 114, 115, 116; and b) a heat transmission route (2) (corresponding to the heat transmission bypass of the present invention) through which the heat is transmitted from the column 111 to the respective strain gauges 113, 114, 115, 116 through the thermo plate 121 and the force transmission portions 104C, 104D on both sides of the sensor plate 104. Therefore, the heat is also bypassed through the heat transmission route (2) comprising the thermo plate 121. Because of the heat bypass effect by the thermo plate 121, the heat is transmitted substantially uniformly to the strain gauges 113, 114, 115, 116 from both sides, thereby reducing the temperature difference among resistors of the strain gauges 113, 114, 115, 116.

Therefore, even when the ambient temperature rapidly changes as mentioned above, the temperature difference caused between the resistors of the strain gauges 113, 114, 115, 116 can be effectively reduced. As a result of this, not only when a normal temperature change is caused but also when a rapid change is caused in the ambient temperature, the force (i.e., the seat weight) can be measured by the strain gauges 113, 114, 115, 116 with great accuracy.

Since the thermo plate 121 comprises a band-like plate made of a heat conductive material, the simple structure of the heat transmission bypass can be achieved and the thermo plate 121 does not increase the size of the seat weight measuring apparatus 100, thus achieving a compact seat weight measuring apparatus 100.

Though the arm 102 is forked into two branches to have two action portions (tips 102A) for transmitting force to the sensor plate 104 in the aforementioned embodiments, the force may be transmitted to the sensor plate 104 through one action portion (tip 102A).

The seat weight measuring apparatus 100 may be arranged between the side frame 3 of the vehicle seat 1 and the upper rail 5 of the seat rail 4.

Though the pivot bolt 110 is positioned on the sensor portion 103 side relative to the stopper bolt 105 in the aforementioned embodiment, the stopper bolt 105 may be positioned on the sensor portion 103 side relative to the pivot bolt 110.

Though the aforementioned embodiment employs the strain gauges 113, 114, 115, 116, other measuring gauges capable of measuring force may be employed.

A seat weight measuring apparatus of the present invention, which can be installed to a seat for a vehicle such as an automobile, is suitably used for various devices to be controlled according to the seat weight of the vehicle, such as a seat belt device for restraining and protecting an occupant according to the seat weight.

The priority application, Japanese Patent Application No. 2003-300905, filed Aug. 26, 2003, including the specification, drawings, claims and abstract, is incorporated herein by reference in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat weight measuring apparatus comprising:
   a base frame;
   a sensor portion which is mounted on the base frame and configured to detect a load applied to a vehicle seat, wherein said sensor portion comprises a sensor plate provided with a plurality of measuring gauges, and the sensor plate is supported by and fixed to a column disposed on said base frame; and
   a heat transmission bypass route from the column to the sensor plate including a heat conducting member positioned to maintain contact with the column and configured to transmit heat from the column through the member to a location on the sensor plate remote from the column.

2. The seat weight measuring apparatus as claimed in claim 1, wherein said heat transmission bypass comprises a thermally conductive plate arranged between said sensor plate and said column.

3. A seat weight measuring apparatus, comprising:
   a base frame;
   a sensor plate;
   a column connecting the base frame to an inner region of the sensor plate; and
   a heat conducting plate positioned to maintain contact with the column and to form part of a heat transmission bypass route to transmit heat from the column to an outer region of the sensor plate,
   wherein the sensor plate comprises at least a first measurement gauge in the inner region and at least a second measurement gauge in the outer region.

4. The seat weight measuring apparatus as in claim 3, wherein the heat conducting plate is configured to transfer heat from said column to said second measurement gauge at a rate approximately equal to a heat transfer rate from said column to said first measurement gauge.

5. A device for detecting an occupant in a seat comprising:
a base frame and a sensor plate supported by and fixed to a column disposed on the frame;
a plurality of measuring gauges located on the sensor plate for measuring load applied to the seat; and
wherein the sensor plate is connected to the column;
wherein the device is configured so that heat is transferred from the column to the sensor plate via a direct route and a bypass route so that heat transmitted from the column to the sensor plate is distributed substantially uniformly to the measuring gauges to thereby improve accuracy of the gauges; and
wherein the direction of heat transfer via the bypass route from the column to the sensor plate includes only one vertical direction.

6. The device of claim 5, further comprising a heat conducting plate connected to the sensor plate and the column.

7. The device of claim 6, wherein the heat conducting plate is connected to the sensor plate at a different location than where the column is connected to the sensor plate.

8. The device of claim 1, wherein the device is configured so that the direction of heat transfer via the bypass route from the column to the sensor plate includes only one vertical direction.

9. The device of claim 3, wherein the device is configured so that the direction of heat transfer via the bypass route from the column to the sensor plate includes only one vertical direction.

10. The device of claim 6, wherein the heat conducting plate is positioned to maintain contact with the column.

* * * * *